F. W. POWERS.
THERMOSTAT.
APPLICATION FILED JULY 5, 1910.
1,064,168.
Patented June 10, 1913.
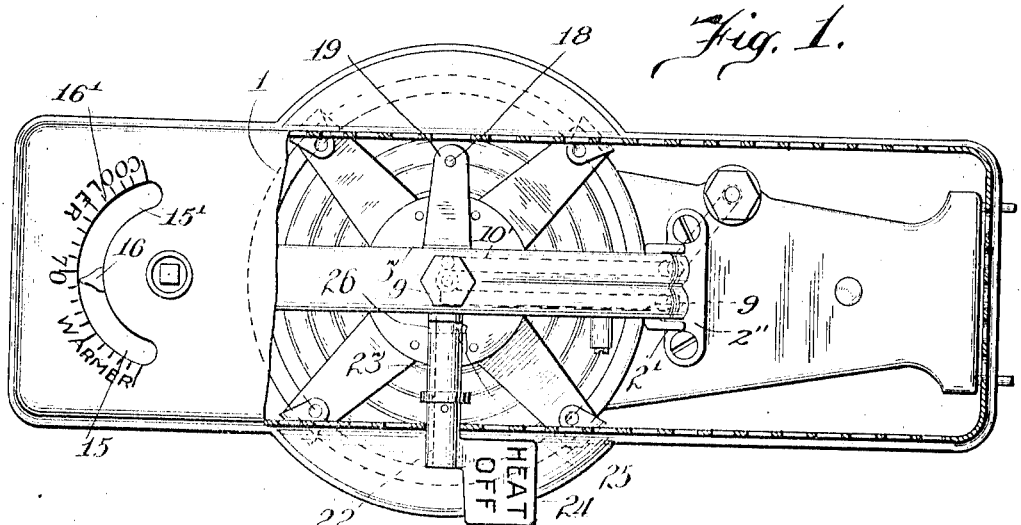
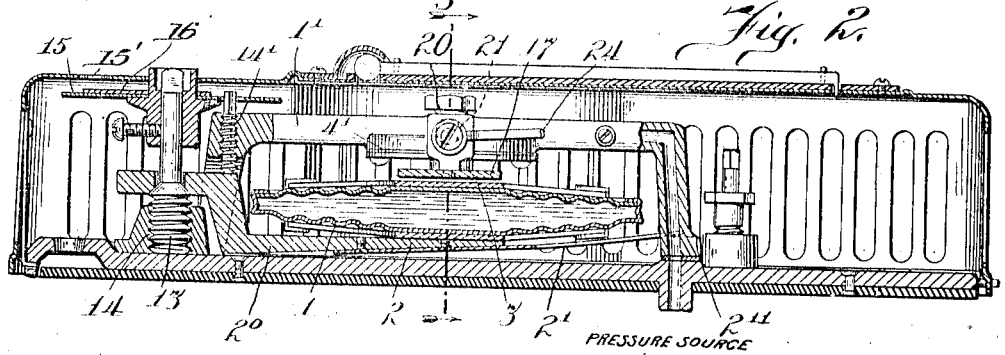
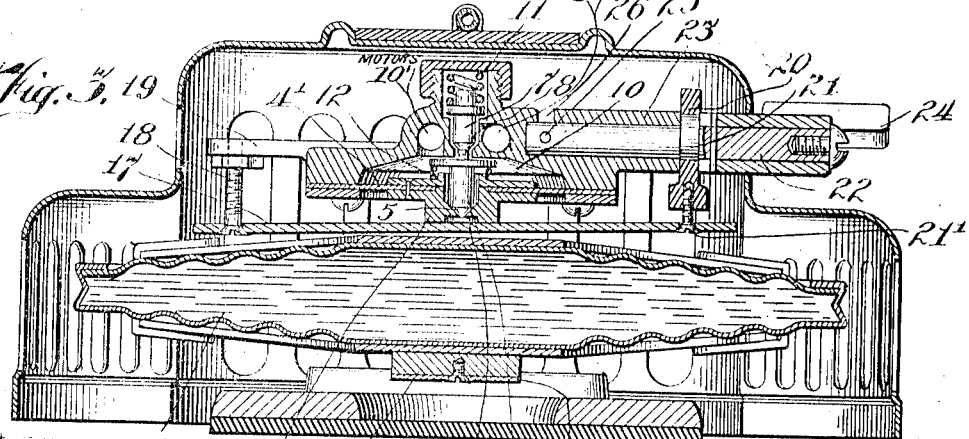
Witnesses
Milton Lenoir
C. J. Schmidt.
Inventor
Fred W. Powers
By Offield Towle Graves & Offield
Attorneys.

UNITED STATES PATENT OFFICE.

FRED W. POWERS, OF CHICAGO, ILLINOIS, ASSIGNOR TO THE POWERS REGULATOR COMPANY, OF CHICAGO, ILLINOIS, A CORPORATION OF ILLINOIS.

THERMOSTAT.

1,064,168.  Specification of Letters Patent.  Patented June 10, 1913.

Application filed July 5, 1910. Serial No. 570,359.

*To all whom it may concern:*

Be it known that I, FRED W. POWERS, a citizen of the United States, residing at Chicago, in the county of Cook and State of Illinois, have invented certain new and useful Improvements in Thermostats, of which the following is a specification.

This invention relates to improvements in thermostats, and relates more particularly to improvements whereby the regulating thermostat may be temporarily and instantly thrown out of regulating control or returned to regulating control of the system it governs, without in any wise modifying or changing its normal adjustment.

In the heating of rooms and apartments in which the heat-supplying system is automatically controlled by thermostats, it is often highly desirable to eliminate the controlling action of the thermostat. For example, in the case of bedrooms it is ordinarily preferred that the bedroom should be entirely without heat during the sleeping hours, yet, particularly in the case of hotels, these rooms are occupied more or less during the day and must then be heated, and usually are heated, under automatic thermostatic control.

In the patent to W. S. Johnson No. 733,210 of July 7, 1903, there is set forth a thermostat provided with means whereby the indicator may be so set as to permanently exclude during the retention of such adjustment heating medium from the heating appliance or apparatus controlled by the thermostat. But in the thermostat shown in said patent the adjustment of the instrument to permanently exclude the heat, results also in destroying its normal adjustment. In other words, when it is desired to restore the thermostat to its normal functional control of the heating system, the same care must be exercised in restoring the indicator to the desired temperature point as would be required when originally installing the instrument. Obviously it is not in all cases, or even usually, feasible to leave the turning on of the heat to an attendant, and frequently the occupant is either unskilled or careless, and in attempting to restore the thermostat to its normal adjustment will set it to a wrong position.

The present invention has for its general object to obviate the difficulties of the character above mentioned.

More specifically stated, the salient objects of the invention are to provide a thermostat having means whereby its functional control may be instantly eliminated or restored without destroying its set adjustment; to provide a thermostat so organized that the matter of putting it out of commission is accomplished without in any wise permanently readjusting those parts which have to do with the automatic regulation; to provide in a thermostat of the character described means whereby the act of putting the thermostat out of or into commission is accomplished by the movement of an indicator which positively discloses the condition of the thermostat; to provide a thermostat of the character described which may be brought into or placed out of commission by simply moving an "off" and "on" lever or button; and in general, to provide an improved thermostat of the character referred to.

The invention is shown as embodied in, and made a part of, a regulating thermostat which in other respects is well known, has been upon the market for some time, and the minutia of which need not therefore be described. The instrument shown is selected simply as one type of thermostat in which the invention may be advantageously embodied.

The invention will be readily understood from the following description, reference being had to the accompanying drawings, in which—

Figure 1 is a plan view, with parts of the casing broken out, of a thermostat equipped with my invention; Fig. 2 is a view partly in side elevation and partly in vertical section of the same instrument; Fig. 3 is a cross sectional view taken on line 3—3 of Fig. 2, and looking in the direction of the arrows; this view being, however, shown on a larger scale.

Referring to the drawings, the thermostat shown is of that type in which a heat-expandible member operates a system of valves which control the flow of pneumatic pressure to motors which serve to turn on and off the heating appliances; the expansion of the expandible member under heat serving to open the valves and let air under pressure through the thermostat, thereby operating the motors to turn off the heat, while the contraction of the expandible member permits the valves to close and brings about the turning on of the heat. It will be seen that if means be provided for forcing open the valve or valves which control the admission of pneumatic pressure to the motors, and holding these valves open regardless of variations in temperature, then the heat will be kept turned off, and this, in short, is what the present invention accomplishes.

Referring again to the drawing, 1 designates as a whole an expandible disk-shaped chamber containing a suitable fluid which expands under heat and contracts under cold; the lower side thereof being connected at its center and resting against an adjusting lever 2. At the opposite side of the disk is arranged a valve body 3 movably supported by a diaphragm 4' and when in functional position adapted to be acted upon by the upper side of the expansible disk 1. Arranged axially within the valve body 3 is a valve 4, the point of which controls a valve port 5 communicating with a vent passage 6. The top side of valve 4 contacts the point of a second valve 7, which controls a port 8 affording communication between a passage or chamber 9 and a second passage or chamber 10. The space 9 communicates with a source of substantially constant pneumatic pressure, while the space 10 communicates with a passage 10' leading to the motors, actuated by pneumatic pressure, and controlling the radiators or other heating devices in a well-understood manner. The valve member 7 is held yieldably in bearing with valve member 4 by a coiled expansion spring 11 acting on its upper end. A second coiled expansion spring 12 interposed between the head of the valve 4 and a subjacent part of the valve body 3, tends to lift the valve from its seat, but spring 11 is the stronger, from which it follows that as the disk expands the valve 4 is first forced to its seat to disconnect the motors from the vent passage 6 and thereafter the disk lifts and forces open valve 7 to connect the motors with the pressure source. Vice versa, as the disk contracts, valve 7 first closes and thereafter valve 4 opens during the further contraction of the disk. This final opening permits venting of the motor or motors which are then actuated by their springs to turn on the heat.

Supporting lever 2 is of two-part construction, comprising a rigid portion 2⁰ and a plate spring extension 2', the end of which latter rests upon a fixed bridge-like support or part of the frame designated 2". The opposite end of the lever is apertured and fits over an adjusting screw 13 whereby it may be adjusted toward or away from the base side of the thermostat by rotating the screw in its threaded socket 14. A fulcrum screw 14' is threaded through the bridge frame 1' and engages lever 2 as shown. Adjusting screw 13 carries a disk 15 and pointer 16, which latter is exposed through a slot 15', and as the screw is rotated in one or the other direction is carried past a scale 16' formed along one margin of the slot.

Setting the thermostat is accomplished by screw 13, rotation in one direction carrying the engaged end of the lever away from the base side of the thermostat, and by reason of the engagement of the lever with the fulcrum screw 14' flexing the spring extension thereof toward the base side of the thermostat and carrying the expansible disk away from the valve mechanism. The reverse operation of the screw 13 moves the expansible disk toward the valve mechanism. Accordingly these valves will be operated at a higher or lower range of temperatures, depending upon the adjustment thus made.

The mechanism thus far described is that heretofore known in thermostats of this type.

Describing, now, the means whereby the thermostat may be thrown out of commission, so to speak, a flat strap-like lever 17 is interposed between the side of the expansible disk and the valve body 3 actuated thereby; one end of this lever being suspended by means of a screw 18 from an overhanging immovable part 19 of the frame, while the opposite end of the lever is connected with a suspension cam 20. The member 20 is at its upper end apertured to fit upon an eccentric wrist 21, which is formed upon a rock shaft 22 journaled in a suitable barrel 23 forming a part of the immovable bridge frame which overlies the expansible disk. Upon the outer end of the rock-shaft 22 is immovably fixed an indicator thumb piece 24, bearing upon one side the legend "Heat off," and upon the other side the legend "Heat on." A stop stud 25 mounted on the rock-shaft 22, and working through a segmental slot 26 in the barrel, limits the movement of the rock-shaft so that it can be rotated only a part of a revolution; this partial rotation causing the eccentric to raise or lower the end of the lever or cut-out 17, as the case may be. The throw of the eccentric is sufficient so that when the cut-out lever is moved to one extreme, valve 7 is fully lifted and the pneumatic pressure admitted, but on the other hand, when the cut-out lever is lowered by the eccentric, it becomes idle and functionless. In order that it may move idly with the expansion and contraction of the disk, both its ends loosely embrace the suspending screws 18 and 21'. The head of the screw 21' is thrown far enough by the eccentric when turned to one limit to permit this end of the cut-out lever to move idly with the disk and therefore not interfere with the free movement of the valve body 3 and associated parts.

The operation of the mechanism has been substantially described in connection with the description of the mechanics thereof. Whenever the thermostat is to be thrown out of commission, the operator simply throws the thumb lever 24 over in such direction as to bring about the lifting of the end of the cut-out lever, and so permanently opens the valves controlling the pneumatic by-pass. In this position the lever indicates "heat off". Vice versa, when the thermostat is to be restored to its normal function of automatically controlling the heating system, the thumb lever is flopped back and the valves thereby lowered into bearing with, or within range of operation of the expansible disk. It will be noted that putting the thermostat out of commission and restoring it in no wise disturbs or modifies the adjustment of the indicator which determines the range of temperature at which the thermostat operates automatically to turn off or turn on the heat. In short, the setting of the thermostat for automatic operation is accomplished in precisely the same manner as though my present improvement were not embodied in the thermostat.

From the foregoing it will be understood that I accomplish the several objects of the invention stated, and this in an extremely simple and effective manner. Nevertheless the invention may be embodied in other forms, and would almost necessarily take different forms when applied to different types of thermostats. Accordingly the claims are to be construed broadly, except in so far as they are made specific.

I claim as my invention:

1. In a thermostat, the combination of an expansible element operable by heat, a valve under the control of said element and itself controlling the fluid pressure passage extending through the thermostat, regulating appliances whereby said thermostat may be variably set for action upon the valve at selected temperatures, a scale and coöperating indicator associated with said regulating appliances, and cut-out mechanism arranged to act upon said valve independently of the expansible element, whereby the thermostat may be cut out of commission, or restored to commission, by the actuation of said cut-out mechanism, without operating or disturbing the adjustment of said regulating appliances.

2. In a thermostat, the combination of an expansible element operable by heat, a valve under the control of said element and itself controlling the fluid pressure passage extending through the thermostat, regulating appliances whereby said thermostat may be variably set for action upon the valve at selected temperatures, a scale and coöperating indicator associated with said regulating appliances, and cut-out mechanism arranged to act upon said valve independently of the expansible element, whereby the thermostat may be cut out of commission, or restored to commission, by the actuation of said cut-out mechanism, without operating or disturbing the adjustment of said regulating appliances, said cut-out mechanism comprising a lever interposed between the expanding element and the valve, manually operable mechanism for actuating said lever, and an indicator and associated legend for determining the condition of said cut-out mechanism.

3. In a thermostat, the combination with the main frame thereof, of an expanding disk mounted in said main frame, a valve mounted in the frame and arranged to control a fluid pressure passage, operative connections between said valve and one side of the expanding disk, an adjusting lever movably supporting the opposite side of said disk, adjusting mechanism and associated indicating mechanism for adjusting one end of said adjusting lever, a cut-out lever arranged to extend between said valve and the proximate side of the expanding disk, means pivotally supporting one end of said cut-out lever, an eccentric mechanism connecting the opposite end of said lever with a rock shaft, and a thumb lever mounted upon said rock shaft.

FRED W. POWERS.

Witnesses:
F. A. GILLESPIE,
W. J. RAINKE.